US006459954B1

(12) United States Patent
Kratzenberg

(10) Patent No.: US 6,459,954 B1
(45) Date of Patent: Oct. 1, 2002

(54) ARRANGEMENT FOR DISPENSING LUGGAGE PUSHCARTS IN MASS TRANSPORTATION FACILITIES

(75) Inventor: Wolfgang Kratzenberg, Schauenburg (DE)

(73) Assignee: Expresso Deutschland Transportgeräte GmbH, Kassel (DE)

( * ) Notice: Subject to any disclaimer, the term of this patent is extended or adjusted under 35 U.S.C. 154(b) by 0 days.

(21) Appl. No.: 08/581,645

(22) Filed: Dec. 28, 1995

(30) Foreign Application Priority Data

Aug. 9, 1995 (DE) ........................................ 195 29 253

(51) Int. Cl.[7] ................................................ G06F 17/00

(52) U.S. Cl. ........................ 700/236; 700/232; 340/935

(58) Field of Search ................................ 364/479, 460, 364/478.01, 478.02, 478.03; 340/933, 935, 323 R, 568, 460, 10.34, 10.1, 10.31, 505, 568.5; 701/300; 705/13, 22, 23, 26, 1; 345/501; 221/3, 9; 235/380, 375; 700/213–215, 28, 231, 232, 225, 236, 237, 241, 244; 194/220, 211, 302, 905, 205

(56) References Cited

U.S. PATENT DOCUMENTS

| | | | | | |
|---|---|---|---|---|---|
| 3,620,340 | A | * | 11/1971 | Jenkins | 194/220 |
| 3,826,344 | A | * | 7/1974 | Whalberg | 194/206 |
| 3,877,768 | A | * | 4/1975 | Novak et al. | 312/334.28 |
| 3,978,959 | A | * | 9/1976 | Muellner | 194/4 R |
| 4,561,091 | A | * | 12/1985 | Scholl et al. | 370/85.3 |
| 4,868,544 | A | * | 9/1989 | Havens | 340/572 |
| 4,912,471 | A | * | 3/1990 | Tyburski et al. | 342/42 |
| 4,968,873 | A | * | 11/1990 | Dethloff et al. | 235/380 |
| 5,051,741 | A | * | 9/1991 | Wesby | 340/825.49 |
| 5,196,846 | A | * | 3/1993 | Brockelsby et al. | 340/933 |
| 5,256,863 | A | * | 10/1993 | Ferguson et al. | 235/383 |
| 5,287,266 | A | * | 2/1994 | Malec et al. | 364/401 |
| 5,305,201 | A | * | 4/1994 | Matthews | 364/410 |
| 5,445,295 | A | * | 8/1995 | Brown | 221/3 |
| 5,462,150 | A | * | 10/1995 | Chang | 194/206 |
| 5,505,473 | A | * | 4/1996 | Radcliffe | 280/79.2 |
| 5,526,916 | A | * | 6/1996 | Amdahl et al. | 194/211 |
| 5,548,637 | A | * | 8/1996 | Heller et al. | 379/201 |
| 5,572,653 | A | * | 11/1996 | DeTemple et al. | 395/501 |

* cited by examiner

*Primary Examiner*—Leo Picard
*Assistant Examiner*—Steven R. Garland
(74) *Attorney, Agent, or Firm*—Sidley Austin Brown & Wood, LLP

(57) ABSTRACT

In extensive and complex installations such as airports or train stations, a sufficient quantity of luggage pushcarts is made available to passengers of arriving mass transportation means at the location of arrival and at the time of arrival of the mass transportation means with the smallest possible expenditure of time and personnel and the payment of a user fee or a security deposit by the individual travelers is facilitated in that the retrieval of individual luggage pushcarts is controlled by means of a cart tracking system comprising a stationary transmitter/receiver system and a mobile transmitter/receiver system and by at least one computer/display unit, and the security deposit acceptance device has a programmable money changing machine which accepts at least one foreign currency.

16 Claims, 7 Drawing Sheets

ARRANGEMENT FOR DISPENSING LUGGAGE PUSHCARTS IN MASS TRANSPORTATION FACILITIES

BACKGROUND OF THE INVENTION

1. Field of the Invention

The invention is directed to an arrangement for dispensing or providing luggage pushcarts in extensive and complex mass transportation facilities such as airports or train stations in which a sufficient quantity of luggage pushcarts must be provided for and made available to passengers of arriving mass transportation means at the location of arrival and at the time of arrival of the mass transportation means for a user fee or at least for a security deposit for transporting the passengers' luggage to individual means of transportation.

2. Description of the Prior Art

In airports or train stations, as conventionally operated, the object of at least placing a luggage pushcart at the disposal of every passenger arriving with the mass transportation means at the proper time and place at the airport arrival gate or train platform is met in a more or less satisfactory manner in that a large number of employees are sent haphazardly, apart from a certain system drawn from experience, collectively or successively into some or all areas of the respective installation, train station or airport, to collect the luggage pushcarts deposited there and bring them to those assembly points, especially to the train platform or airport arrival gate, where the next mass transportation means to come in will arrive. Since the time and location of arrival and the number of passengers arriving with the mass transportation means, train or airplane, are known but the current location of the individual available luggage pushcarts which are spread out over the entire installation is only approximately known, the conventional method requires a considerable expenditure of time and personnel to seek out and gather the luggage pushcarts and to deliver them at the proper time to the individual cart stores which are set up at the arrival points of the mass transportation means, i.e., the airport gate or train platform, especially also since the respective state of fullness of these cart stores must be taken into account.

However, it is not only on the operator's or provider's side that the conventional method of providing luggage pushcarts is encumbered with considerable defects. Of no less gravity are the faults of the known systems which result from the fact that the luggage pushcarts which are stored in the cart stores can usually only be removed for a borrower fee or at least for a coin deposit using certain coins in the currency of the country in question. For this purpose, the stores containing the luggage pushcarts are outfitted with a coin-operated removal device such that a luggage pushcart can only be removed from the store at all by inserting one or more suitable coins into the coin-operated machine. Therefore, especially in international airports in countries with a less commonly used currency, arriving travelers very often have the problem that they are either carrying none of the country's currency or, if they are, that there is no possibility in the baggage pickup area to exchange larger notes for the coins needed to remove a luggage pushcart from the store.

Further, the arriving traveler is also confronted by a similar problem when he or she desires to use public transit upon leaving the airport or train station and tickets for such public transit, as are commonly used at present, are dispensed only by machines, in particular coin-operated machines.

It follows from the foregoing that conventional arrangements for providing and dispensing luggage pushcarts in airports and train stations or the like points of arrival of more or less regularly operating mass transportation means such as airplanes or trains are highly unsatisfactory both for the operators of the train station or airport and for the individual travelers because they are complicated, expensive and not user-friendly.

SUMMARY OF THE INVENTION

Proceeding from the set of problems described above, the object upon which the present invention is based is to provide an arrangement for providing and dispensing luggage pushcarts which solves the two problem groups described above simultaneously and equally advantageously in such a way that, on the one hand, a sufficient quantity of luggage pushcarts can be made available at the appropriate time at the respective point of arrival, a train platform or airport arrival gate, with the fewest possible total number of luggage pushcarts and the smallest possible expenditure of time and personnel and, on the other hand, the arriving travelers can also remove a luggage pushcart from a store when not in possession of specific coins in the currency of the country in question.

According to the invention, this object is met substantially by the features indicated in claim 1. The use of a cart tracking system having transmitter/receiver units which are arranged alternately at the luggage pushcarts and at stationary arrangements in the installation makes it possible to collect luggage pushcarts which are scattered about the installation in the shortest possible time and with the smallest possible number of personnel and to bring them to the respective cart stores in due time for the arrival of the mass transportation means. At the same time, the use of cart stores which are outfitted with a programmable coin deposit accepting device which is at least partially independent of currency provides the individual travelers with the advantage that a luggage pushcart can be removed from the store even when the traveler is not in possession of suitable coins in the currency of the country in question. The surprising advantage of the proposed solution consists primarily in that both sets of problems are solved by an individual integrated arrangement which can be installed at a relatively modest expense resulting in a considerable savings for the operator of the train station or airport, while, at the same time, the individual traveler can also acquire the currency of the country practically without losses. For the most part, the individual traveler has the further advantage that he or she also acquires, at the same time, change in the country's currency suitable for subsequent use of public transit such as a streetcar or bus.

Since the active transponders forming the mobile receiver/transmitter carry a first group of unchangeable data unmistakably characterizing the individual carts and can send this data as a detection signal, the current location of the individual cart and other statistical data such as the frequency of use, if required, can be determined and information, e.g., concerning scheduled maintenance, can be derived therefrom. Since the active transponders forming the mobile receiver/transmitter also carry a second group of changeable data at the same time, every luggage pushcart can be provided with an identification for the deposited sum when removed from the cart store and this identification can activate the deposit return device of a cart store when the cart is returned, wherein the deposit return simultaneously transmits a cancel signal for the changeable data of the respective transponder so as to prevent multiple deposit returns. For the operators of the train station or airport, this results in the advantage that the dispensing and retrieving of luggage pushcarts is protected absolutely against criminal misuse. The unchangeable data stored in the active transponders can comprise specifics concerning the identification of the cart, e.g., the cart number, date information, e.g., initial date of use, maintenance deadlines, or the like.

In order to determine the current whereabouts of the individual carts with sufficient reliability, it is proposed that a device for detecting the movement direction of each cart be. arranged at all passageways and crossings between two areas of the installation so that it can be determined whether a cart passing a stationary transmitter/receiver unit located at these passageways and crossings is entering or has just exited the respective area of the installation. According to a special feature of the invention, this is effected in that a transmitter/receiver unit which is designed as a double unit comprising two transmitter/receiver stations located at a distance from one another in the direction of the passageway or crossing is arranged at all passageways and crossings between two areas of the installation, both transmitter/receiver stations being coupled with one another via a logic circuit in such a way that a movement direction signal is determined from the sequence of successive response signals intercepted from the cart and is added to the detection signal. Further, since the movement direction signal is simply added to the individual detection signal of every cart, the system also at the same time supplies the stationary transmitter/receiver units designed as double stations with information concerning the current location of the specific cart in the installation.

Further, in a preferred construction, the transnutter/receiver units of the stationary transmitter/receiver system within a prompting field constantly emit a prompting signal and are provided in each instance with a device for preventing data collisions which also enables a trouble-free identification of a plurality of luggage pushcarts entering the prompting field simultaneously. This also results in that transponders which are located in the prompting field of a stationary transmitter/receiver unit are turned off after supplying the requested data so that power consumption is minimized. The antennae of the stationary transmitter/receiver units can be arranged on the ground but, in the interests of simplified assembly, are advisably arranged at the walls of the respective building sections. The active transponders can accordingly be arranged either at the underside of the luggage pushcart or at another suitable location thereon. The antennae of the stationary transmitter/receiver units are advisably arranged at entrances to the individual sectors of the overall installation. For the purpose of interrogating the entire supply of luggage pushcarts concerning maintenance work due, for example, the arrangement according to the invention comprises at least one mobile transmitter/receiver unit for detecting the group of unchangeable data of each transponder.

The arrangement according to the invention can also be used for purposes other than simply for managing luggage pushcarts as described above. In particular, it is possible to outfit individuals or groups of persons with coded active transponders so that their current location within the extensive airport or train station installation can be detected quickly. This can be advantageous particularly during prolonged waiting periods within the installation when the persons in question, e.g., children, must be found or when the members of a group of travelers must be assembled at a certain meeting place at a previously unspecified time.

For a less costly realization of the arrangement according to the invention, a first possibility is provided in that the stationary transmitter/receiver system of the cart tracking system and the releasing or dispensing devices of the cart stores which are outfitted with a coin deposit acceptance device are continuously connected with at least one display unit or command unit or supply unit formed by a central computer or host computer via the network formed by an existing telephone line system already installed in the installation.

Depending on given circumstances, it is also possible within the framework of an equally advantageous realization that the stationary transmitter/receiver system of the cart tracking system and the dispensing devices of the cart stores outfitted with the coin deposit acceptance device and a quantity of display units or command units and supply units contained in the system and at least one host computer can be constantly connected with one another by means of an open computer network, wherein the parts of the open computer network include existing networks and existing computer units, display units or switching units. The particular advantage in this possible realization consists primarily in that it involves the use of existing lines and simple supplementation thereof and also enables an easy integration of existing internal and external computer units and display units or switching units and, finally, also makes possible a virtually unlimited expansion by means of connectable units.

The decision as to which of the two proposed possible realizations will be given preference substantially depends upon the usability of existing equipment on the one hand and upon the required capacity of the arrangement, in particular with respect to the anticipated required expansions or alterations, on the other hand.

Regardless of which of the possible realizations for the electronic network is selected, it is further provided, according to the invention, that the receiver/transmitter unit onboard every luggage pushcart is protected from external mechanical damage and from tampering and is outfitted with an antenna integrated in the frame of the cart. The coin deposit acceptance device which is coupled with the device for releasing the individual carts in exchange for a coin deposit or borrower fee, which device controls the delivery opening of the cart store, comprises at least one money acceptance device which accepts foreign currency and a coin dispensing device which is controllable by means of a programmable computer which is connected downstream of the money acceptance device, wherein the money acceptance device has at least two insertion openings, one of which is designed to accept paper money, while the other is designed to accept coins, these insertion openings being combined, respectively, with a money or coin testing device, wherein a storage magazine containing only one type of coin is connected upstream of the coin dispensing device. For this purpose, the money testing device associated with the paper-money acceptance device can be outfitted with means for detecting and testing at least two different types of currency notes, especially foreign currency notes, and for generating a signal or a corresponding series of signals which is derived therefrom and is suitable for processing in a computer arranged downstream, and the computer arranged downstream of the money testing device can be connected to a central programming device for the continuous correction of an operand, in particular at least one set value representing a rate of exchange. Based on general experience, the paper currency acceptance device need only be able to accept, detect and test notes of one or two common international currencies for this purpose and transmit a signal or sequence of signals for the computer corresponding to the detected value of the accepted banknote. This construction of a coin-operated machine controlling the opening of the cart store for dispensing and removing is particularly advantageous in that the computer controlling the coin dispenser and/or the cart release can be programmed in such a way that it converts the detected value of an inserted banknote into the currency of the present country based on the most current rate of exchange and consequently dispenses a quantity of coins in the country's currency corresponding to the current exchange value of the monetary amount inserted, also, if appropriate, while retaining the coin or coins required for releasing the cart. A coin-operated machine outfitted in this way accordingly allows the traveler to remove a luggage pushcart from the store not only by inserting coins in the country's currency but also by paying the deposit or borrower fee in a currency other than that of the present country and, in so doing, also to receive the domestic currency in smaller denominations for other purposes.

When currencies are subject to extremely sharp fluctuations in the rate of exchange, the computer can also be connected to an external exchange rate office for continuously updating the rate of conversion, in particular a bank or currency market service, rather than to a central programming device.

Further, in an advisable construction of the invention the coin-operated machine controlling the release of the carts is outfitted with an additional coin acceptance device and this additional coin acceptance device, or the coin tester arranged upstream of the latter, is outfitted with a device for directly controlling the mechanism releasing the luggage pushcarts while bypassing the computer such that the additional coin acceptance device also enables the actuation of the coin-operated machine and luggage pushcart release by inserting one or more coins in the country's currency.

Further, the invention can be carried out in particular in that the coin-operated machine is provided with at least two money reservoirs which are connected with one another in a drive-type arrangement by means of the computer, one of which money reservoirs is constructed as a money collecting cassette while the other is filled with coins in the currency of the present country.

Further, a design of the arrangement which can be operated with the fewest possible personnel could be characterized in that the central data processing system comprises a computer unit for detecting the pushcart demand and exchange rate requirements determined by the flight schedule or train schedule and for detecting the current whereabouts of the luggage pushcarts, as well as a comparison display and information concerning the current status of the arrangements for the supply of pushcarts, in particular a video monitor.

The central part of the arrangement for providing pushcarts is advisably formed of an electronic data acquisition installation in which the movement data and, when appropriate, the location data of all luggage pushcarts is detected and fed to a computer which, if required, links the sum of the location data of the carts moving into and out of each individual area of the overall installation and generates from this data an indication of the number of luggage pushcarts located at that moment in each individual area of the overall installation or in the individual assembling points. The computer can be a commercially available PC, i.e., a conventional video monitor work station, and, further, can be so configured that it either automatically cancels historic inquiry results, i.e., inquiries which have already been made once or have been repeated over a period of time, or saves them to a statistical storage. In particular, the train schedules or flight schedules of the mass transportation means are also stored at the same time in the computer forming the central part of the administrating arrangement such that the computer can also indicate via the video monitor, at the same time, the quantity of luggage pushcarts required at the respective time, location and train platform or flight arrival gate.

Further, the outfitting of the central part of the arrangement for providing pushcarts can be expanded optionally and outfitted for detecting and displaying additional data required for administration or, for example, for recalling luggage pushcarts for maintenance work at regular intervals or the like. With regard to the acquisition of data in the detection device or the processing of data in the computer unit, every response signal which proceeds from a luggage pushcart and which is provided, where appropriate, with a movement direction signal is advisably provided with a clock time signal in order to reliably display the instantaneous current distribution of individual luggage pushcarts on the one hand and to achieve a selection criterion for the data to be erased from the memory of the computing unit on the other hand. Of course, the response signals of the individual luggage pushcarts can also be supplemented by a time signal at another location, e.g., in the transnutter/receiver unit, if provided.

In the following exemplary description, the invention is described in detail with reference to an embodiment example shown in the drawing.

DETAILED DESCRIPTION OF THE PREFERRED EMBODIMENT

Figure 1:
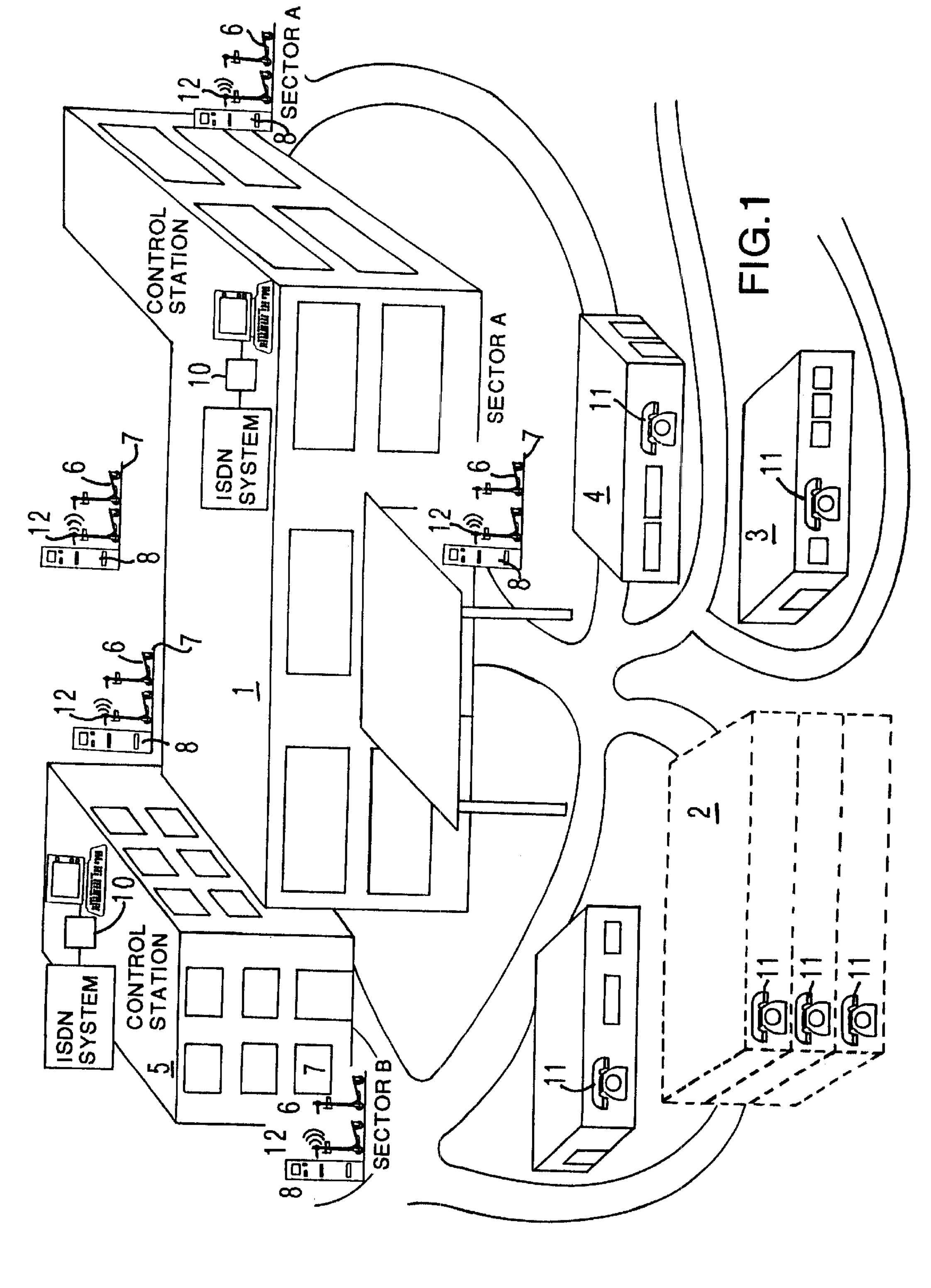
FIG. 1 shows a schematic view of an airport installation which is outfitted with an arrangement FIG. 2 a schematic view of the organization of an arrangement for providing luggage pushcarts.
Figure 2:
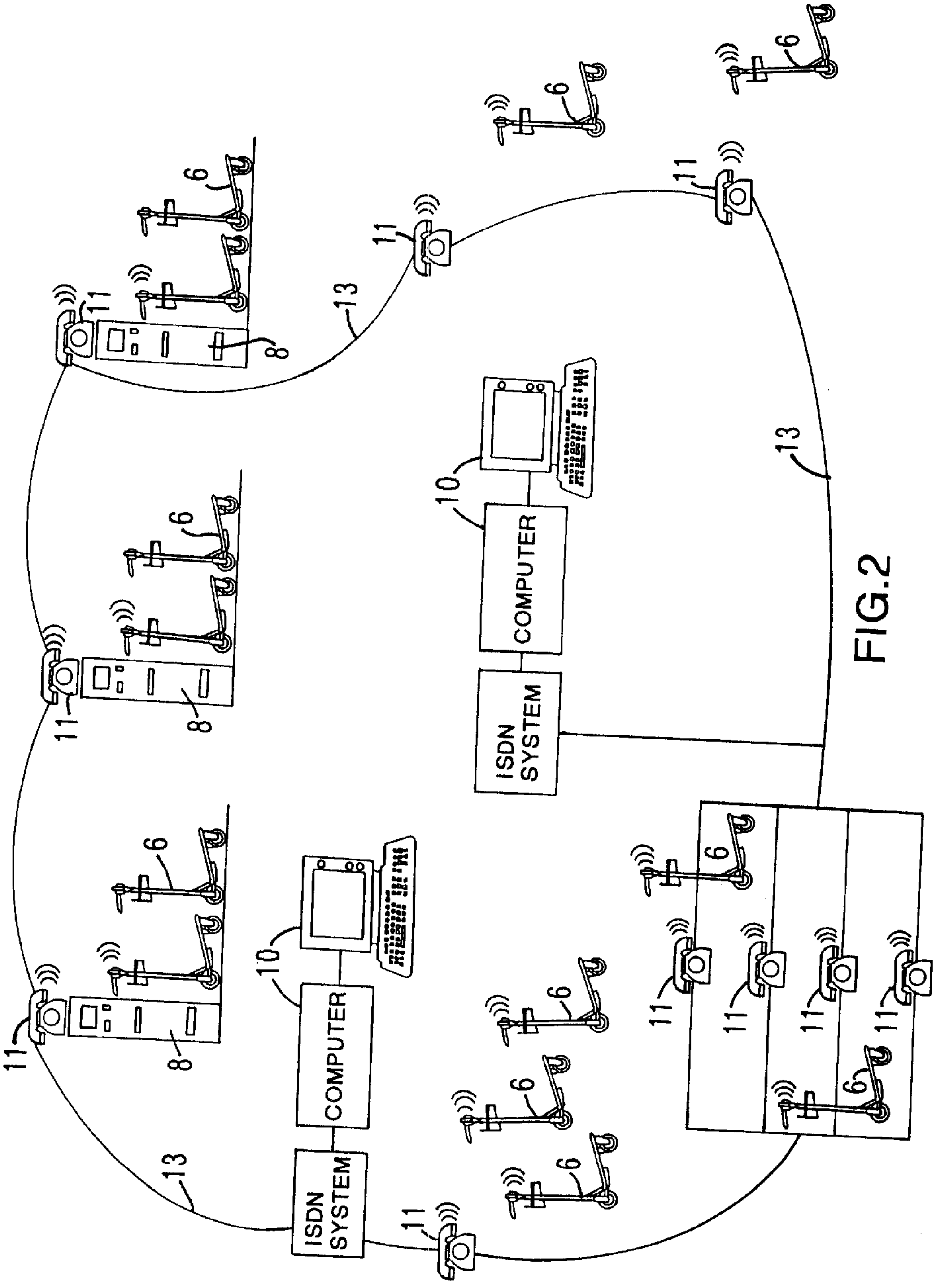
Figure 3:
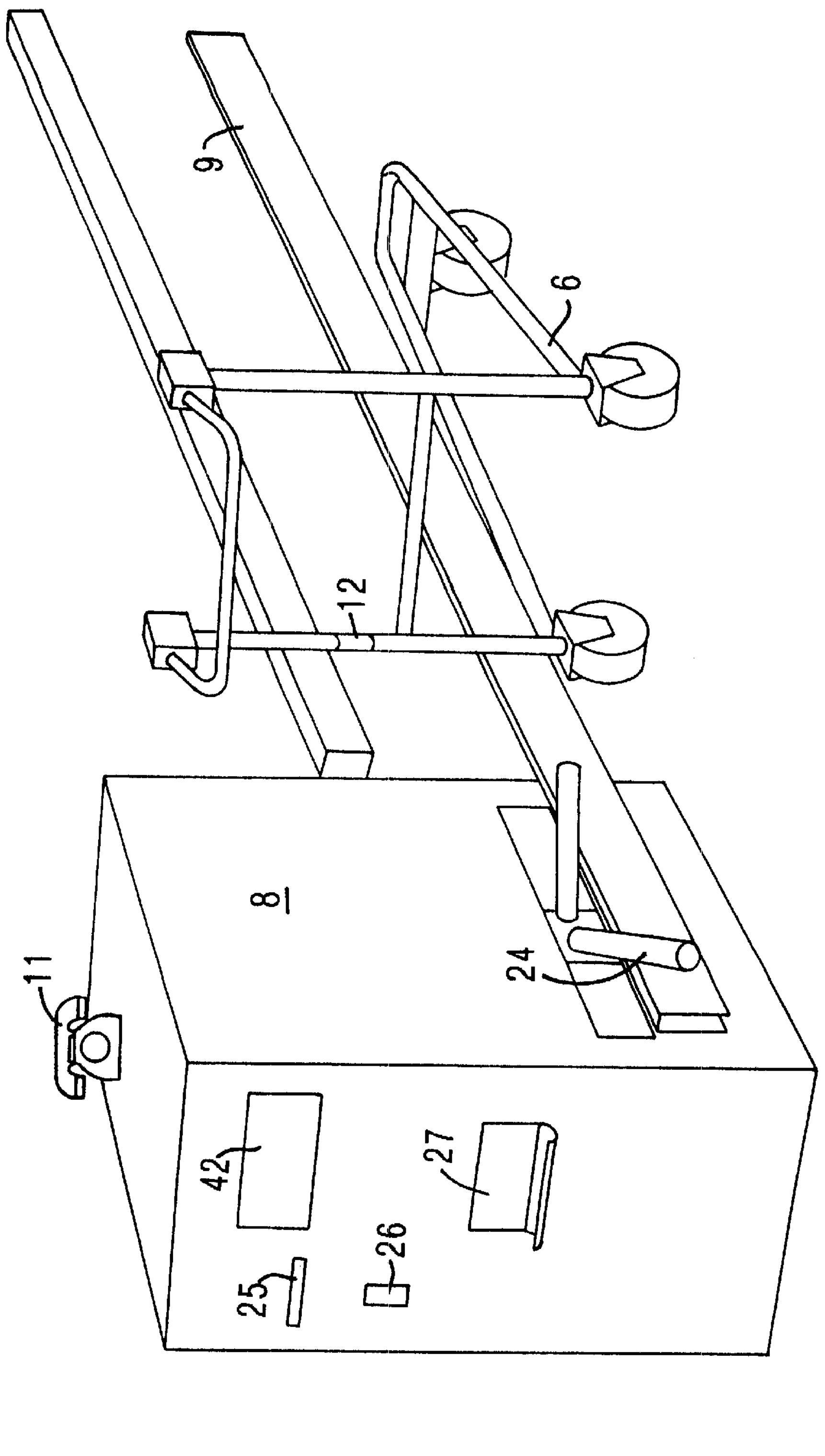
FIG. 3 shows a schematic view of a cart store with a coin-operated machine controlling its delivery opening.
Figure 6:
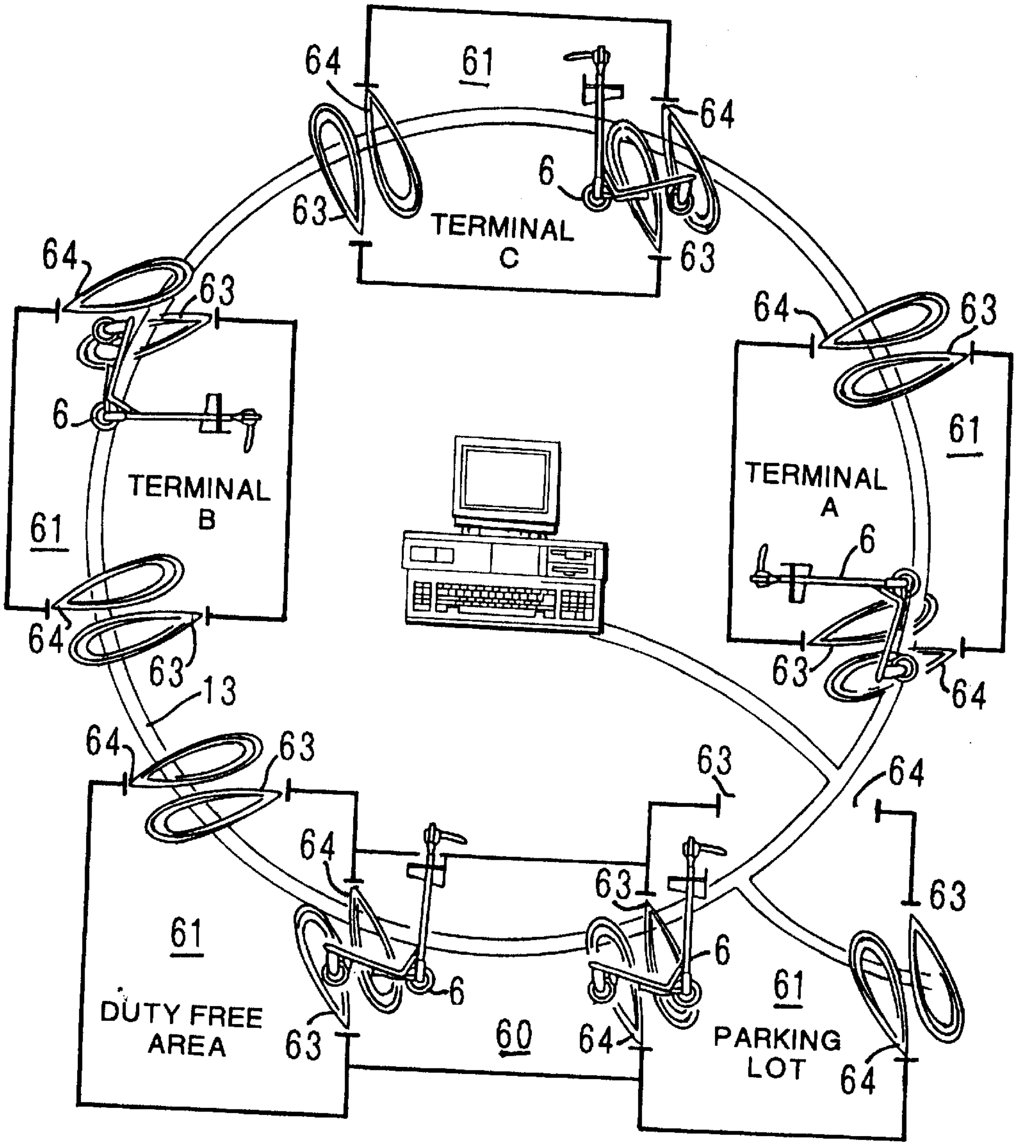
FIG. 6 is another schematic view showing the distribution of the stationary transmitter/receiver units.
Figure 7:
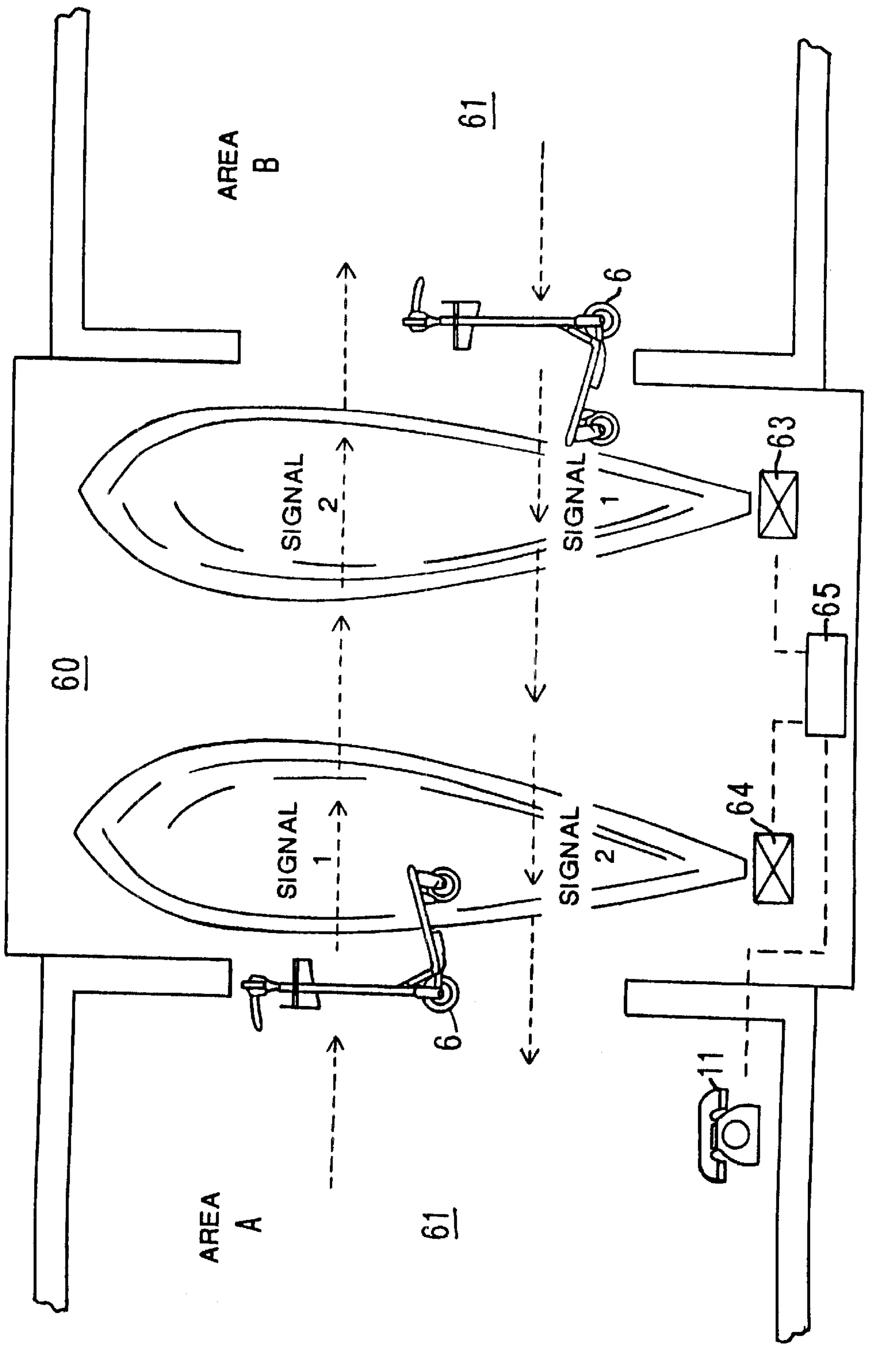
FIG. 7 shows a schematic view of a stationary transmitter/receiver unit designed as a double station.

The airport installation which is shown schematically in FIG. 1 has a central check-in building 1, an underground parking lot 2, a bus and subway station 3, a taxi stand 4, and an administration building 5. In the described installation, a plurality of luggage pushcarts 6 is placed at the disposal of arriving travelers to transport their baggage from the arriving mass transportation means to individual transportation means, a motor vehicle, taxi, bus or subway. The luggage pushcarts 6 are provided in cart racks or cart stores 7 and can be removed from the respective cart store 7 by individual travelers upon payment of a borrower fee or user fee. For this purpose, the cart stores 7 are outfitted with a coin deposit acceptance device 8 controlling their delivery opening so that the arriving traveler can remove a luggage pushcart 6 from the cart store 7 upon inserting a coin deposit. As will be seen especially from the view in FIG. 3, the cart stores 7 substantially comprise an individual locking rail 9 which locks in the luggage pushcarts 6 located therein and an automatic coin deposit device 8 which controls the delivery opening of the cart store 7 by means of a mechanical arrangement 24. In addition to these devices formed by the cart stores 7 for storing and providing luggage pushcarts 6, a cart tracking system formed of a stationary transmitter/receiver system and a mobile transmitter/receiver system is provided. This cart tracking system is outfitted with at least one central computer/display unit 10 which is installed in the check-in building 1 or administration building 5. In the embodiment example shown in the drawing, some of the transmitter/receivers 11 of the stationary transmitter/receiver system are arranged so as to be distributed throughout the installation at the passageways or crossings 60 between the individual areas 61 of the overall installation and at the entrances to dead-end areas of the overall installation and some are coupled with the cart-providing arrangements 7 and their coin deposit acceptance devices 8 and are connected to a network 13 of electric lines which is not shown in detail in the drawing (see especially FIGS. 6 and 7). For this purpose, in particular, the transmitter/receiver units arranged at all passageways and crossings 60 between two areas 61 of the installation are designed in each instance as double stations and comprise two transmitter/receiver stations 63 and 64 which are arranged at a distance from one another in the direction of the passageway or crossing and which are coupled with one another via a logic circuit 65 in such a way that a movement direction signal is determined from the sequence of response signals successively intercepted for each cart by the transmitter/receiver stations 63 and 64 of a transnutter/receiver unit designed as a double unit and is added to the detection signal fed to the central computer unit. As a result of this construction of the transnutter/receiver units, it is possible to determine whether a cart passing a stationary transmitter/receiver unit is moving into the area of the installation in question or has just left this area. The stationary transmitter/receiver units constructed as a double station are optionally coupled with suitably arranged telephone apparatus 11. The electrical network is formed predominantly by the existing telephone network in the installation. The mobile transmitter/receiver system is formed of a plurality of transponders 12 arranged at the individual luggage pushcarts 6. The transponders 12 are set up in such a way that when an interrogation signal is sent by a stationary transmitter 11 they send back a response signal characterizing the individual luggage pushcart, this response signal being intercepted by the stationary receiver unit 11 and transmitted via the network 13 to the central computer unit 10. Since each stationary transmitter/receiver 11 is associated with a sector of the installation, the area of the installation in which a large number of luggage pushcarts 6 are currently located can be determined by successive interrogation of the cart movements determined by the individual transmitter/receivers 11, so that the personnel employed for retrieving the luggage pushcarts can be sent in a planned manner to that area of the installation in which the largest possible quantity of luggage pushcarts 6 are assembled and the latter can be brought back to the cart stores 7. At the same time, since each individual cart store 7 is outfitted with a transmitter/receiver unit 11, the instantaneous filling status of the individual cart stores 7 can also be determined and the collected luggage pushcarts 6 can be directed so as to fill up the appropriate individual stores 7.

Figure 4:
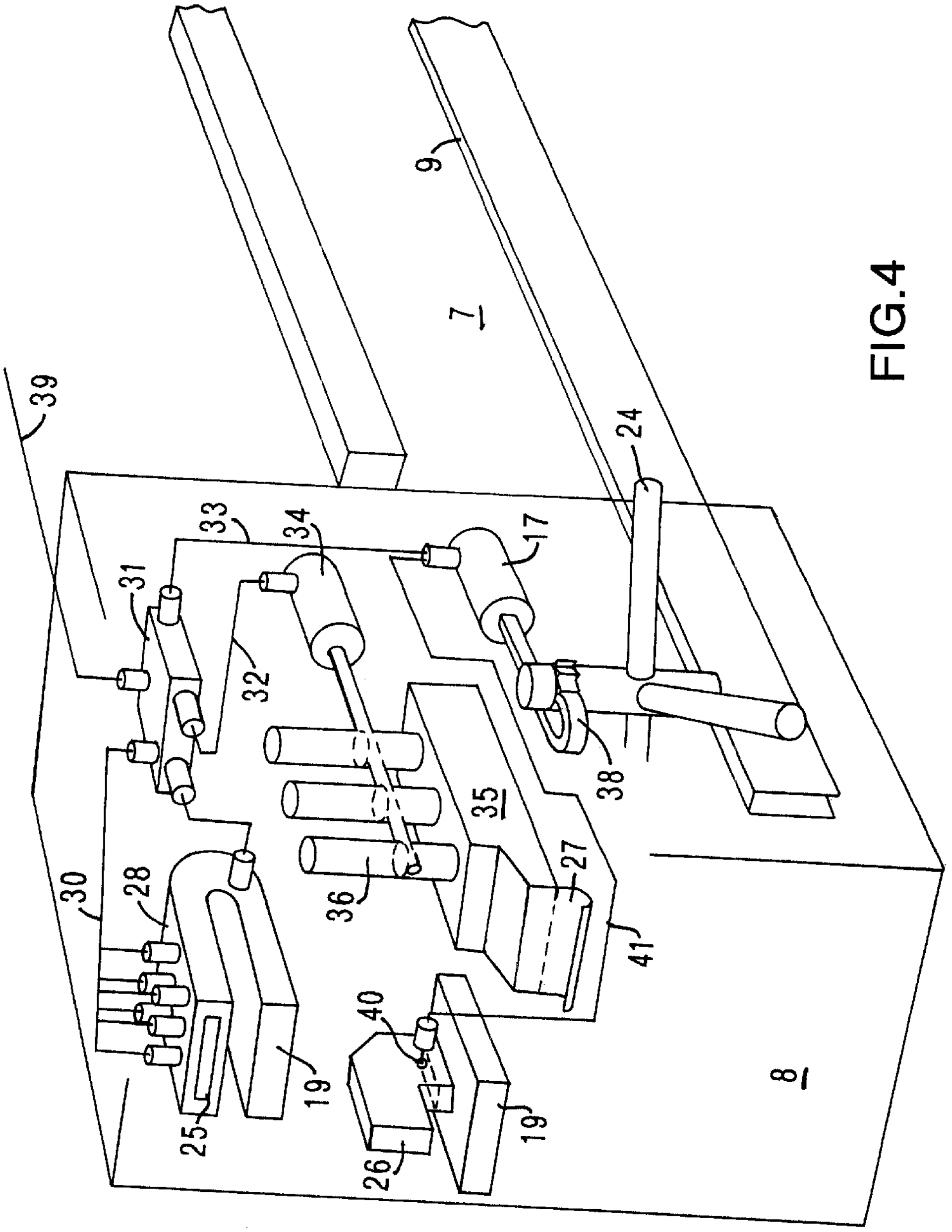
FIG. 4 shows a schematic view of the construction of the automatic coin-operated device according to FIG. 3.
Figure 5:
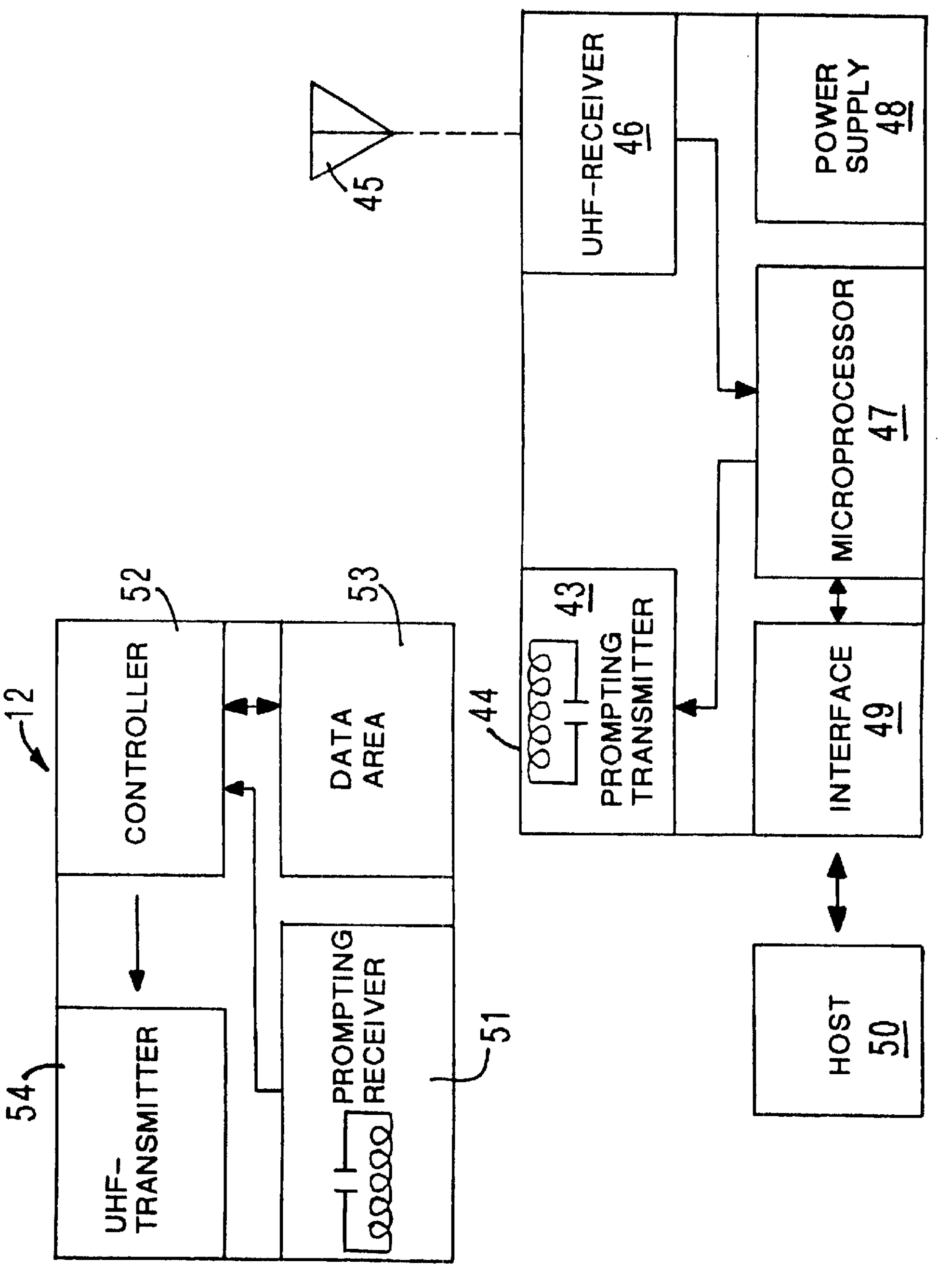
FIG. 5 shows a schematic view of the parts of the stationary transmitter/receiver system and mobile transmitter/receiver system.

As is shown in the detailed view in FIGS. 4 and 5, a plurality of luggage pushcarts 22 are stored in a store 7 and protected against unauthorized removal. The delivery opening of the store 7 is controlled by a coin-operated machine 8 which engages luggage pushcarts 6 contained in the store 7 by means of blocking arms 24 which are suspended so as to be rotatable about a vertical axis and which can be released only by inserting a coin deposit or borrower fee. The coin-operated machine 8 is outfitted with an insertion and acceptance device 25 for banknotes or paper money, an insertion slot 26 for coins, and a coin dispensing device 27. The insertion and acceptance device 25 for banknotes or paper money is outfitted with a denomination and authenticity detection device 28. At the same time, a money collection box 19 is arranged downstream of the insertion and acceptance device 25. A coin return device is omitted from the drawing. The denomination and authenticity detection device 28 associated with the insertion and acceptance device 25 for banknotes or paper money is connected, via a first line 30, with a programmable computer 31 which is coupled in turn, via additional lines 32 and 33, with a drive 34 for the dispensing device 5 of a coin cartridge 36 and with a drive 17 for disengaging the lock 38 of the blocking arms 24 which are suspended so as to be rotatable about a vertical axis and control the release opening of the cart store 7. The computer 31 is connected, via a third line 39, with a remote programming station, not shown in more detail, for occasional or continuous input of the current rate of exchange. Further, a coin tester 40 is arranged downstream of the coin insertion slot. This coin tester 40 is designed to accept coins in the currency of the present country and is directly coupled, via a fourth line 41 so as to bypass the computer, with the drive 37 for disengaging the lock 38 of the blocking arms 24 which are suspended so as to be rotatable about a vertical axis and which control the release opening of the cart store 1, this coupling being effected in such a way that the coin-operated machine and luggage pushcart release can also be actuated by inserting coins in the currency of the present country. A video monitor 42 is arranged at the coin deposit acceptance devices 8 in each instance and displays operating instructions and, if required, the successive steps such as “insert deposit”, “remove change” or “remove cart” and the like. In the schematic view of the interaction between the stationary transmitter/receiver system and the mobile transmitter/receiver system shown in FIG. 5, a stationary transmitter/receiver unit 11 is outfitted with a prompting transmitter 43 and an integrated transmitter antenna 44 associated with the latter, a receiver antenna 45, a receiver 46 connected downstream of the latter, a microprocessor 47, a power supply 48, and an interface 49 for the host computer 50. In addition to a battery for safeguarding the power supply, the active transponder 12 of the mobile transmitter/receiver system contains a prompting receiver 51, a controller 52 which can be controlled by the latter, a data storage 53 which is likewise connected to the controller and contains a first group of unchangeable data and a second group of data which can be overwritten and canceled, and a transmitter 54. The stationary transmitter/receiver unit 11 generates a prompting field via its prompting transmitter 43, wherein every transponder 12 entering the prompting field is excited via its prompting receiver 51 to send a transmission signal containing its data. The controller provided in the transponder ensures that the transmitter 54 of the transponder 12 is stopped after the transmission signal is sent. When detecting a data collision such as can come about when a plurality of transponders 12 enter the prompting field of the prompting transmitter 43 simultaneously, the microprocessor 47 contained in the stationary transmitter/receiver unit 11 automatically initiates a selection process such that each of the entering transponders 12 is individually excited and then stopped after sending its data signal.

What is claimed is:

1. Arrangement for dispensing luggage pushcarts in extensive and complex mass transportation facilities such as airports or train stations in which a sufficient quantity of luggage pushcarts must be provided for and made available to passengers of arriving mass transportation means at allocation of arrival and at a time of arrival of the mass transportation means for a user for a purpose of transporting the passengers' luggage to individual means of transportation, the arrangement comprising:

devices for storing and providing luggage pushcarts formed by a number of cart stores comprising an individual locking rail and a mechanical removal blocking means structurally integrate therewith, the removal blocking means being released by means of coin deposit acceptance and return devices;

a cart tracking system comprising a stationary transmitter/receiver system with a plurality of stationary transmitter/receiver units which are arranged so as to be distributed at selected locations in the area of the installation with antennae of the stationary transmitter/receiver units being arranged at entrances, exits and crossings of passageways between individual areas of the facility;

a mobile transmitter/receiver system formed by active transponders arranged at the individual luggage pushcarts; and at least one computer/display unit, wherein the transmitter/receiver units of the stationary transmitter/receiver system, which are arranged at the passageways or crossings between two areas of a facility, are formed of double stations and all of the transmitter/receiver units of the stationary transmitter/receiver system and the cart-providing devices and their coin deposit acceptance devices are connected to a network of electric lines, wherein the mobile transmitter/receiver system is formed by active transponders which are arranged at the individual luggage pushcarts and which can be activated at least by a prompting signal which can be sent by the stationary transmitter/receiver units, wherein each of the active transponders arranged at the individual luggage pushcarts carries a first group of unchangeable data and a second group of data which can be generated, read and erased by means of programming devices, wherein the coin deposit acceptance and coin deposit return devices arranged at the cart stores are outfitted in each instance with a part coding system for the active transponders of the luggage pushcarts and a transmitter/receiver unit which is coupled with a device which detects the part coding of the active transponders and erases the part coding of the active transponders, wherein the coin deposit acceptance device further comprises a programmable money changing machine which accepts at least one foreign currency and which is connected, via a computer arranged downstream, to a central programming device for continuously updating at least one operand, in particular at least one value setting which represents a currency exchange rate, and wherein the coin deposit acceptance and return devices are outfitted in each instance with an individual video monitor for displaying operating instructions.

2. Arrangement according to claim 1, wherein characterized in that the stationary transmitter/receiver units which are provided at all passageways and crossings between two areas of the installation are designed in each instance as double stations comprising two transmitter/ receiver stations which are arranged at a distance from one another in the direction of the passageway or crossing, the transmitter/receiver stations of a double unit being coupled with one another via a logic circuit in such a way that a movement direction signal is determined from the sequence of successive response signals intercepted from the cart and is added to the detection signal of the individual cart.

3. Arrangement according to claim 1, wherein the transmitter/receiver units of the stationary transmitter/receiver system are provided in each instance with a device for preventing data collisions which also enables a trouble-free identification of a plurality of luggage pushcarts entering a prompting field simultaneously.

4. Arrangement according to claim 1, wherein the antennae of the stationary transmitter/receiver units are arranged on a ground and the active transponders are arranged at an underside of the luggage pushcarts.

5. Arrangement according to claim 1, wherein the antennae of the stationary transmitter/receiver units are arranged at building walls defining entrances and exits of passageways and crossing between individual areas of the facility, and the active transponders are arranged at corresponding and suitable locations on the luggage pushcart.

6. Arrangement according to claim 1, wherein the stationary transmitter/receiver system of the cart tracking system and releasing devices of the cart stores which are outfitted with a coin deposit acceptance device are continuously connected with at least one of a display unit, command unit, and a supply unit formed by a host computer via a network formed by an existing telephone line system already installed in the facility.

7. Arrangement according to claim 1, wherein the stationary transmitter/receiver system of the cart tracking system and delivery devices of the cart stores outfitted with the coin deposit acceptance device and a quantity of one of display units, command units, and supply units contained in the system, and at least one central computer are constantly connected with one another by an open computer network, wherein the parts of the open computer network include existing networks and existing computer units, display units and switching units.

8. Arrangement according to claim 1, wherein the coin deposit acceptance device which is coupled with a device for releasing the individual carts in exchange for a coin deposit or borrower fee, which device controls the delivery opening of the cart store, comprises a money acceptance device which accepts at least one foreign currency, and a coin dispensing device which is controllable by a programmable computer which is connected downstream of the money acceptance device, wherein the money acceptance device has at least two insertion openings, one of which is designed to accept paper money, while the other is designed to accept coins, the insertion openings being combined, respectively, with a money or coin testing device, wherein a storage magazine containing only one type of coin is connected upstream of the coin dispensing device.

9. Arrangement according to claim 1, wherein a stationary transmitter/receiver units are arranged in each instance at an acceptance device of cart stores which are outfitted in particular with a coin deposit change-return mechanism, and the coin deposit return device of every cart store is controllable exclusively by a coded transmission signal of a cart.

10. Arrangement according to claim 1, wherein a central data processing system comprises a computer unit for detecting a pushcart demand and exchange rate requirements determined by a flight schedule or train schedule and for detecting a current whereabouts of the luggage pushcarts, as well as a comparison display and information device for displaying a current status of the arrangements for the supply of pushcarts.

11. An arrangement according to claim 10, wherein the display and information device comprises a video monitor.

12. Arrangement according to claim 1, wherein at least a money testing device associated with a paper-money acceptance device is outfitted with means for detecting and testing at least two different types of currency notes and for generating, one of a signal and a corresponding series of signals derived therefrom and suitable for processing in a computer arranged downstream.

13. Arrangement according to claim 12, wherein a computer arranged downstream of the money testing device is connected to the central programming device for the continuous correction of the at least one operand, and in that a drive device for releasing carts and a drive device for the coin dispensing device are controllable at the same time by data generated by the computer.

14. Arrangement according to claim 1, wherein first and second coin testing devices are provided, which second coin testing device can detect and evaluate only one coin or banknote, and in that there are two collecting containers which are connected with one another via a computer, one of which collecting containers is filled with coins of a specified currency, while another collecting container is constructed as a money collecting cassette.

15. Arrangement according to claim 1, wherein provided three collecting containers which are interconnected via a computer, one of which collecting containers is filled with coins of a specified type or currency, another collecting container is constructed as a money collecting cassette, and a third collecting container is constructed as a deposit mark reservoir, and in that the collecting container filled with coins in the domestic currency and a supplying device associated with the deposit mark reservoir can be driven, respectively, in the manner of a step feed mechanism.

16. Arrangement according to claim 1, wherein a computing unit is connected to an exchange rate office and is continuously provided with current exchange values of coins to be dispensed in relation to an inserted payment and effects a control of the coin delivery and cart release in accordance with an actual exchange rate at that moment.

* * * * *